United States Patent [19]

Krusche

[11] Patent Number: 4,461,148
[45] Date of Patent: Jul. 24, 1984

[54] HYDROSTATIC DRIVE SYSTEMS

[75] Inventor: Alfred Krusche, Johannesberg, Fed. Rep. of Germany

[73] Assignee: Linde Aktiengesellschaft, Hollriegelskreuth, Fed. Rep. of Germany

[21] Appl. No.: 324,402

[22] Filed: Nov. 24, 1981

[30] Foreign Application Priority Data

Nov. 24, 1980 [DE] Fed. Rep. of Germany ....... 3044171

[51] Int. Cl.³ .............................................. F16H 39/48
[52] U.S. Cl. .......................................... 60/421; 91/28; 91/518
[58] Field of Search ................. 60/420, 421, 422, 428; 91/28, 29, 517, 518

[56] References Cited

U.S. PATENT DOCUMENTS 4,354,420 10/1982 Bianchetta ............................ 60/421

FOREIGN PATENT DOCUMENTS 2440251 3/1976 Fed. Rep. of Germany .
133698 1/1979 Fed. Rep. of Germany .
1131750 10/1968 United Kingdom .
1413689 11/1975 United Kingdom .

Primary Examiner—Robert E. Garrett
Assistant Examiner—John M. Husar
Attorney, Agent, or Firm—Buell, Blenko, Ziesenheim & Beck

[57] ABSTRACT

A hydrostatic drive system consisting of at least two component systems is provided, each component consisting of an adjustable pump, where the loading of the pump adjusting cylinder is regulated by a hydraulically controlled servo control valve, one side of which is acted upon by the delivery pressure of the associated pump and the other side is acted upon through a control pressure line by pressure beyond the metering restrictor, the improvement comprising a coupling valve to which all delivery lines and all the control pressure lines are connected, each through a branch connection line wherein the said valve in the closed position shuts off all the branch connection lines and in the open position connects all the delivery lines together and all the control pressure lines together and is hydraulically controlled, a first pressure chamber on one side of said valve to which each delivery line is connected, a valve element in said pressure chamber being loaded with a pretensioned spring on said first chamber, and a second pressure chamber on the other side of said valve element to which each control line is connected, the said two pressure chambers assigned to one component system being of the same size on both sides of the valve element and the open position of the valve element being set when a pressure gradient prescribed by the pretensioning between the delivery line and the control pressure line is no longer reached.

4 Claims, 12 Drawing Figures

HYDROSTATIC DRIVE SYSTEMS

This invention relates to hydrostatic drive systems and particularly to a hydrostatic drive system that consists of at least two component systems, each of which has an adjustable pump and a delivery line coming from it and leading to at least one consumer, in which line an arbitrarily adjustable metering restrictor is located, and a pump adjusting cylinder, where an adjusting piston connected with the adjusting element of the pump is capable of sliding in the pump adjusting cylinder, and where the loading of the pump adjusting cylinder is controlled by a controlled servo control valve, one side of which is acted upon by the delivery pressure of the pump and the other side is acted upon through a control pressure line by the pressure beyond the metering restrictor.

Hydrostatic drive systems with two pumps, each of which delivers to a control device block, are known, in which case several consumers are connected to each control device block and in which an additional valve is present, by the actuation of which the delivery stream of the two pumps can be conveyed into one of the two control device blocks as, for example, that disclosed in German DE-OS No. 19 52 034.

The familiar switching arrangements of this type cannot be used in connection with drive systems in which no control device blocks are present, but the stream flowing to each individual consumer can be controlled by the arbitrary setting of a metering restrictor assigned to this consumer and the adjustment of the pump is effected so that the pressure gradient at this metering restrictor corresponds to a prescribed value.

The invention proposes a simple arrangement which in a drive system of this type effects an automatic coupling of the delivery streams of both pumps as soon as a metering restrictor is opened so wide that one pump alone can no longer deliver a stream such that the prescribed pressure gradient is maintained at this metering restrictor.

For solving this problem, it is provided in accordance with the invention that the delivery lines of all the pumps and the control pressure lines assigned to these pumps are connected, each through a branch connecting line, to a coupling valve that shuts off all the branch connecting lines in the closed position and in the open position connects all the delivery lines together and all the control pressure lines together and which automatically opens as soon as the pressure gradient drops below the prescribed value at the metering restrictor or at a metering restrictor.

It is particularly advantageous if the coupling valve is hydraulically controlled, in which case each delivery line is connected with a pressure chamber on one side of the valve element loaded by a spring and each control line is connected with a pressure chamber on the other side of the valve element and where the two pressure chambers assigned to a component system are of equal size on both sides of the valve element or are of different size as a function of the prescribed pressure gradient and the spring tension. As a result, the connecting valve opens as a function of the spring pretension as soon as the pressure gradient at the metering restrictor drops below a predetermined value. It is expediently provided here that all the delivery lines are connected on one side of the valve element and all the control pressure lines are connected on the other side.

The spring pretensioning is selected so that the open position is set when a pressure gradient specified by the spring pretensioning is no longer reached.

One embodiment particularly advantageous in function results if the valve is designed so that when the valve element is shifted from the closed position to the open position, the control lines are first connected together and only then are the delivery lines connected together. The following effect is achieved by the fact that only the delivery lines are connected together first: if only one pump is in the operating position and the other is in the idle stroke position and the pressure gradient at the metering restrictor drops below the prescribed value, the control lines are connected together, with the result that the second pump is first adjusted to the same pressure, i.e., that the second pump which previously delivered only a prescribed minimal stream through a by-pass restrictor, is adjusted to a greater stream, that is, until this larger stream produces the same pressure at the fixed restrictor provided in the by-pass line as the pressure against which the first pump delivers. Only then, when both pumps are delivering against the same pressure, are the delivery lines connected together, with the result that the second pump now also swings out farther, in accordance with the control pressure signal, until it produces the stream required to supplement the delivery stream of the first pump so that the prescribed pressure gradient is present at the adjustable restrictor. In order to facilitate this method of regulation, it is thus necessary or at least expedient if each pump is equipped with a by-pass line in which a preferably fixed restrictor is located and through which a minimal stream flows, which can, if necessary, also be limited by a flow regulator.

Drive systems of this type are frequently equipped with a maximum-load regulating element, which swings the pump or, in the case of several pumps, each of the pumps toward a smaller stroke volume and thus a smaller torque input if the r.p.m. of the pump drive shaft drops as a result of overloading of the primary energy source, until the primary energy source again reaches the prescribed r.p.m. In a drive system in which the pump is set at a prescribed pressure gradient at a metering restrictor in the branch delivery line to the consumer there is the possibility that the pressure gradient at the metering restrictor will be less than the prescribed value when the maximum-load regulating element engages and the pump is thus swung back to a smaller delivery stream, in which case the element rendered operative at the servo control valve of the pump adjusting element is thus overridden by the maximum-load control element. In a drive system of this type with a maximum-load control element and with a coupling arrangement of the type described above there is thus the danger that when the maximum-load control element engages, the pressure gradient at the metering restrictor becomes so small that the coupling arrangement is thus actuated and couples the delivery stream of both pumps, even though this is by no means intented since the drop in pressure gradient at the metering restrictor is not caused by a correspondingly wide opening of the latter, but rather by an excessive pressure in the delivery line.

In order to eliminate this shortcoming also, it is provided in accordance with another step of the invention that the signal of the maximum-load regulating element also acts on the coupling valve so that the switching point at which the two delivery lines are connected together by the valve is shifted to an extent corresponding to the extent of engagement of the maximum load regulating valve. For example, it can be provided that the coupling valve connects the two delivery lines together if in the system of one pump the pressure difference between the delivery line and control line drops below 15 bar, provided the maximum-load regulating element does not engage. However, if the maximum-load regulating element sends a signal to the pump that corresponds to a pressure gradient of 5 bar, the coupling unit switches in only when the pressure difference between the delivery line and control line has dropped below 10 bar. This additional dependence of the coupling valve on the maximum-load regulating element has the result that when the maximum-load regulating element engages, the coupling unit does not also connect the delivery lines of the various pumps together if the pressure gardient at the metering restrictor drops below the critical value that is provided in order to actuate the automatic coupling of the delivery streams through connection of the delivery lines by means of the coupling valve.

In the foregoing general description, I have set out certain objects, purposes and advantages of this invention. Other objects, purposes and advantages will be apparent from a consideration of the following description and the accompanying drawings in which.

Figure 1:
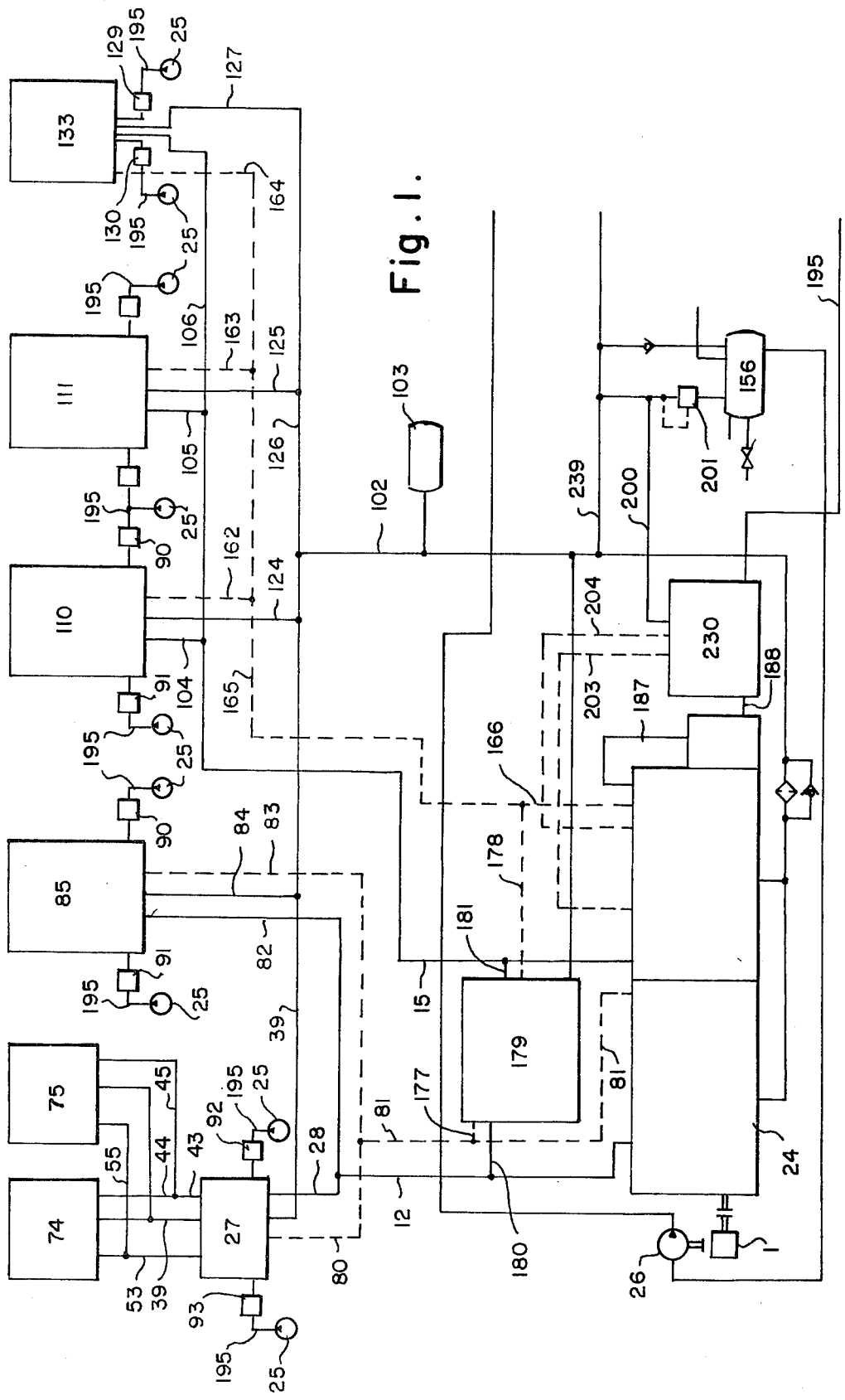
FIG. 1 shows an overall circuit diagram, the individual components of which are indicated only in rough outline.
Figure 2:
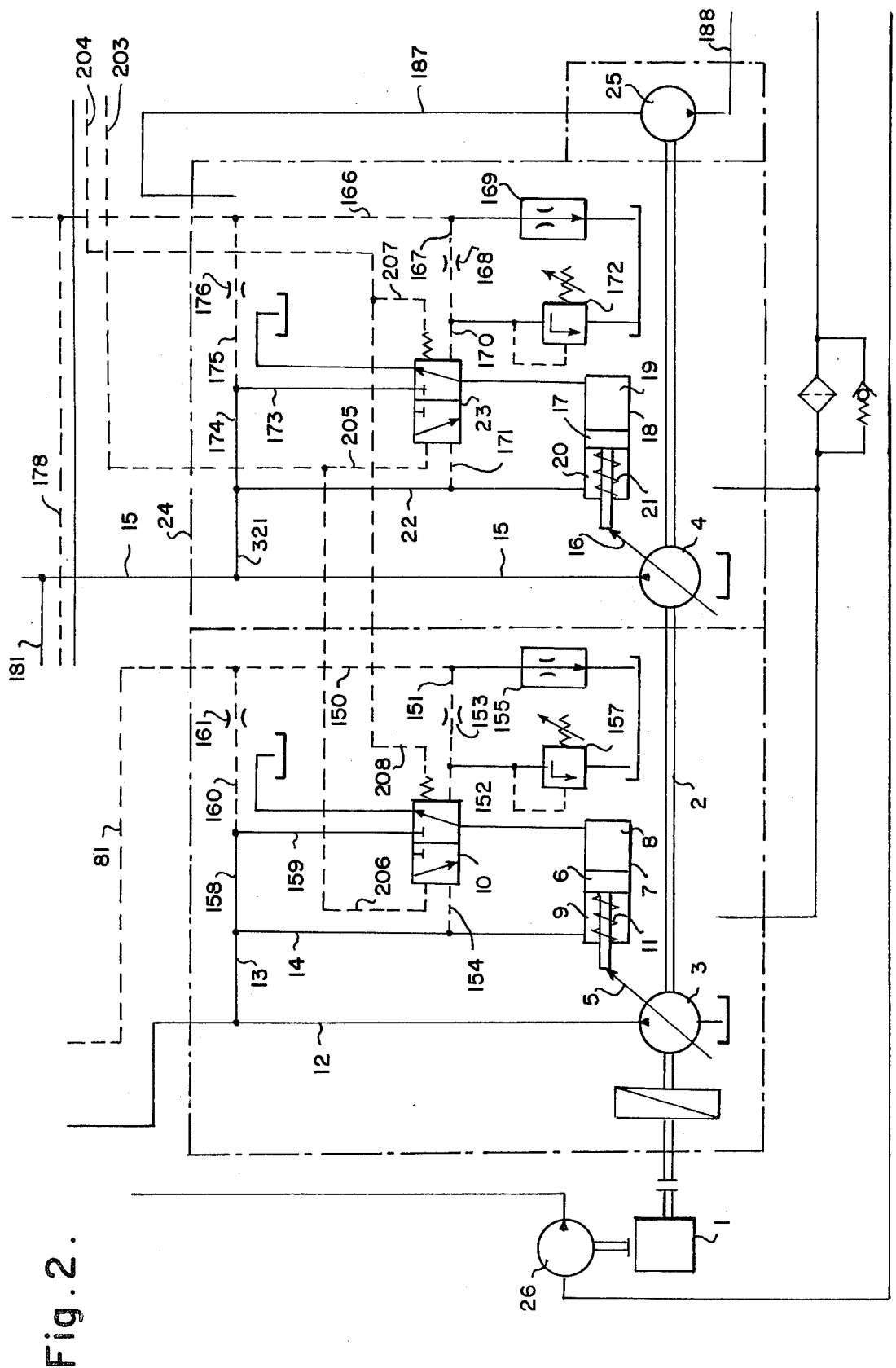
FIG. 2 shows the circuit diagram for the double-pump unit used in FIG. 1.
Figure 3:
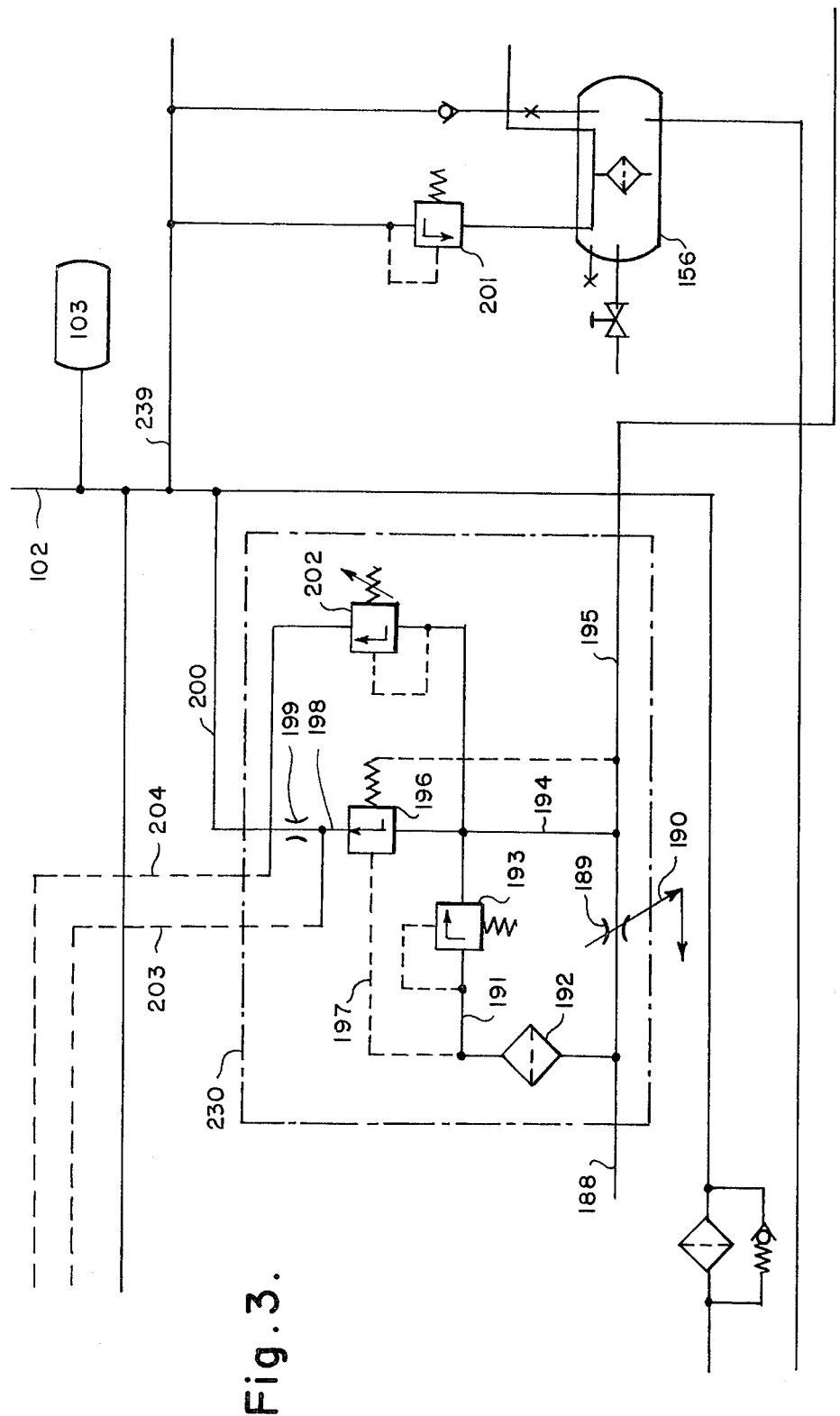
FIG. 3 shows the circuit diagram for the maximum-load control unit used in FIG. 1.

The pumps 3 and 4 are driven by the internal-combustion engine 1 by means of the shaft 2. The adjusting element 5 of the pump 3 is connected with a pump adjusting piston 6, which is capable of sliding in a pump adjusting cylinder 7 and divides it into two pressure chambers 8 and 9. The pump 3 delivers into a delivery line 12, from which the pressure chamber 9 is loaded through the branch lines 13 and 14; a spring 11 is located in this pressure chamber 9. The loading of the pressure chamber 8 is regulated through a hydraulically controlled servo control valve 10.

Pump 4 delivers into a delivery line 15. The adjusting element 16 of pump 4 is connected with a pump adjusting piston 17, which is capable of sliding in a pump adjusting cylinder 18 and divides it into two pressure chambers 19 and 20, where a spring 21 is located in pressure chamber 20. This chamber 20 is connected to the delivery line 15 through a branch line 321 and another branch line 22. The loading of the pressure chamber 19 is regulated through a hydraulically controlled servo control valve 23. Both pumps 3 and 4 are located in a common housing 24.

Two additional pumps 25 and 26, designed as constant pumps, are driven from shaft 2 (the pump 26 can however also be driven by a secondary power take-off of the engine 1 in another construction type).

A branch delivery line 28 branches off from the delivery line 12; it leads to a partial control unit 27, in which the branch delivery line 28 is divided into two partial lines 29 and 30. Each of the two component lines 29 and 30 leads to a single-edge servo valve spool 31 or 32 in which case the single-edge servo valve spool 31 is hydraulically controlled and is loaded with pressure through a pressure pick-off control line 33 from an arbitrarily actuatable control pressure pick-off 92 located in the operator's cab of the dredger. In just such a manner the hydraulically controlled single-edge servo valve spool 32 is loaded with control pressure through a pressure pick-off control line 34, in which case the line 34 leads to another, arbitrarily actuatable control pressure pick-off 93, also located in the operator's cab. The single-edge servo valve spools 31 and 32 function as metering restrictors, through which a throttled stream is passed from partial line 29 to line 35 or from partial line 30 to line 36. In the other position the single-edge servo valve spool 31 connects line 35 with the return line 37 and in precisely the same manner, in the other position, the valve spool 32 connects lines 36 and 38, in which case the two return lines 37 and 38 lead jointly to the branch return line 39.

The line 35 leads to a parallel-connecting restrictor 40 with a slide valve body 41, whose back side is loaded by a spring 42 and by the control pressure present in a control pressure line 53. A line 43 comes from the parallel-connecting restrictor 40 and separates into two lines 44 and 45, which lead to a pressure chamber 46 and 47 respectively of the two working cylinders 48 and 49 connected in parallel to each other and provided for "lifting" in the dredger.

Analogously, the line 36 leads to a parallel-connecting restrictor 50 with a slide valve body 51, whose back side is loaded by a spring 52 and by the pressure in a control line 53. A line 53 comes from the parallel-connecting restrictor 50 and divides into two lines 54 and 55, of which line 54 leads to the pressure chamber 56 of the working cylinder 48 and line 55 leads to the pressure chamber 57 of the working cylinder 49.

A check valve 58 opening toward the working cylinder 48 is located in line 54. A line 59 is connected to line 54 between the check valve 58 and the working cylinder 48; it leads to a controlled relief valve jet 60, whose drain leads through line 61 and line 62 to the component return line 39. A line 63 is also connected between the check valve 58 and the working cylinder 48 to the line 54; a resuction check valve 64 is located in line 63 and it is also connected to line 62.

Analogously, a check valve 68 is located in line 44 and a line 65 is connected between the check valve 68 and the working cylinder 48; a resuction check valve 66 is located in line 65 and it is also connected to the line 62. A line 69 is also connected to line 44 between the check valve 68 and the working cylinder 48 and it leads to a hydraulically controlled relief valve jet 70, whose discharge line 71 is connected to the line 62. The control pressure chamber of the relief valve jet 70 is connected through the line 72 to line 54 in front of the check valve 58 and in precisely the same manner the control pressure space of the relief valve jet 60 is connected through line 73 to the line 44 in front of the check valve 68. If line 54 is carrying pressure, the control pressure chamber of relief valve jet 70 is loaded with this pressure and thus the relief valve jet is relieved of spring pressure, so that it opens with a more or less slight pressure in line 44 and, inversely, the same is true for the relief valve jet 60 if line 44 carries pressure in front of the check valve 68.

These valves 58, 64, 60, 70, 68, 66 are combined into one control unit 74, which is attached directly to the working cylinder 48.

An analogously identical valve arrangement is provided in the the control unit 75, which is attached to the working cylinder 49.

A line 76 is connected to line 53 inside of the component control unit 27 and it leads to a check valve 77. A line 78 is also connected to the line 43 and it leads to a check valve 79. The two check valves 77 and 79 are on the other hand connected to the control pressure component line 80, to which the pressure chambers are also connected beyond the slide valve bodies 41 and 51.

A relief check valve 94 opening toward the line 35 is located in the slide valve 41. In precisely the same manner, a relief check valve 95 opening toward line 36 is located in the slide valve 51. The control pressure line 80 leads to an overall control pressure line 81, to which a branch control pressure line 83 is connected. A branch line 82 is connected to the delivery line 12. The two branch lines 82 and 83 lead to an overall control unit 85, from which a return line 84, which is connected to the return line 39, departs. The overall control unit 85 is attached to the working cylinder 86, which serves to actuate the shovel of the dredger. The overall switching arrangement of the overall control unit 85 is analogous to the sum of the component control unit 27 and the control unit 74. Two single-edge servo valve spools 287 and 87 are provided, of which the spool 287 is acted upon through a pressure pick-off control pressure line 88 by an arbitrarily actuatable control pressure pick-off 90, which is located in the vicinity of the control pressure pick-offs 92 and 93, which act on the pressure pick-off control pressure lines 33 and 34. Correspondingly, the single-edge servo valve spool 87 is regulated by means of a pressure pick-off control pressure line 89, which in turn also leads to an arbitrarily actuatable control pressure pick-off 91, which is located in the vicinity of the control pressure pick-offs 90, 92, 93.

A parallel-connecting restrictor, 96 and 97 respectively, is connected beyond the two single-edge servo valve spools 287 and 87, which act as metering restrictors; a branch line leading to the component control pressure line 83 branches off at a connection point 98 and 99 respectively, each with a check valve 100 or 101, beyond the parallel-connecting restrictor 96 or 97.

The return line 39 leads to a main return line 102, which leads directly into the housing 24 of the pumps and is connected to a prestressed reservoir tank 103.

Branch lines 104, 105, 106 branch off from the delivery line 15 coming from the pump 4, of which the branch delivery line 104 leads to a working cylinder 107 for bending the shovel arm, branch delivery line 105 leads to a hydraulic motor 108 for traveling, and branch delivery line 106 leads to a hydraulic motor 109 for swivelling the dredger. The overall control units 110 and 111 are constructed precisely the same as the overall control unit 85. That is, they each contain two single-edge slide valves 112 and 113 or 114 and 115 and a parallel-connecting restrictor 116, 117, 118, and 119 is respectively connected beyond them, in which case the single-edge servo valve spool 112 is acted upon by an arbitrarily actuatable control pressure pick-off 120 and the single-edge servo valve spool 113 is acted upon from a control pressure pick-off 121. Spool 114 is acted upon from a control pressure pick-off 122 and spool 115 is acted upon from a control pressure pick-off 123. The component return lines 124 and 125 coming from the overall control devices 110 and 111 all lead to a branch return line 126, which is connected to the main return line 102. The same is true for return line 127. The lines 106 and 127 are connected to a 4-connection/3-position valve 128, which is regulated hydraulically by the two control pressure pick-offs 129 and 130 and selectively connects either one connection 131 of the hydraulic motor 109 with the delivery line 106 and the other connection 132 of hydraulic motor 109 with the return line 127 or inversely, the delivery line 106 with connection 132 and the return line 127 with the connection 131. A supplementary control unit 133 is also provided here; it is attached directly to the hydraulic motor 109 and two check valves 134 and 135 and two relief valve jets 136 and 137 and connections 138 and 139 for a control pressure line 140 are provided in it; in which case check valves 141 and 142 respectively are located between the control pressure line 140 and the connections 139 and 138.

The overall control pressure line 81 assigned to pump 3 continues in the control pressure line 150, which leads to a branch line 152, in which a restrictor 152 is located and which leads to a pressure chamber of the hydraulically regulated servo control valve 10. The opposite pressure chamber is connected through the branch line 154 to the line 14, which is acted upon by the pressure in the delivery line 12 of the pump 3.

A flow regulator 155 is also connected to the line 150; its discharge leads into the inner chamber of the housing 24 of pumps 3 and 4.

A relief valve jet 157 is connected to line 152 between the restrictor 153 and the control pressure chamber of the servo control valve 10.

A line 158 comes from line 13; it leads to a connection 159 of the servo control valve 10 so that pressure medium delivered by pump 3 through this line 158 and connection 159 can be conveyed through the delivery line 12, the lines 13, 158, and the connection 159 through the servo control valve 10 into the pressure chamber 8.

There is a connecting line 160 between the line 158 and the line 150, in which a by-pass restrictor 161 is located (this line 160 with the restrictor 161 can be omitted if the servo control valve 10 is designed with a sufficiently large negative overlap so that with the servo control valve 10 in the neutral position a partial stream continuously flows through the lines 12, 13 158 and the connection 159 to the pressureless tank 156 or preferably into the internal chamber of the housing 24 of pumps 3 and 4. This solution has the advantage that the flow regulator 155 does not additionally need to be adjusted to the stream flowing through the by-pass restrictor 161).

The component control pressure lines 162, 163, and 164 come from the control units 110 and 111 and from the control device 133; they are connected to an overall control pressure line 165, which continues into the line 166, to which the line 167 with the restrictor 168 is connected and to which the flow regulator 169 is connected. The line 170 coming from the restrictor 168 leads to a pressure chamber of the hydraulically controlled servo control valve 23, whose opposite pressure chamber is connected through connection 171 to the line 22. A relief valve jet 172 is connected to the line 170.

The connection 173 of the servo control valve 23 is connected to line 321 through line 174. A connecting line 175 is located between the lines 174 and 166; contains a by-pass throttle 176 (the same is true here as with regard to the line 160 and restrictor 161).

A coupling control line 177 is connected to the overall control pressure line 81 and a coupling control line 178 is connected to the overall control pressure line 165, in which case these two control lines lead to the coupling unit 179. A 4-connection/2-position valve 182 is located in the latter; it is hydraulically controlled and has two control pressure chambers on each side, where a control pressure chamber of identical size on one side is assigned to each control pressure chamber on the other side, but where it is not necessary for the two control pressure chambers located on one side to have the same diameter. A branch line 180 leads from the delivery line 12 into the coupling unit 179 and a branch line 181 also leads from the delivery line 15 into the coupling unit 179. The two lines 180 and 181 are connected here to the 4-connection/2-way valve 182 such that in the position of it shown the lines 180 and 181 are connected together and in its other position these lines are shut off. The control pressure lines 177 and 178 are connected to the two other connections of the 4-connection/2-way valve 182 such that in the position of the valve slide shown the lines 177 and 178 are connected together.

Two relief valve jets 184 and 185 are also located in the coupling unit 179, jet 184 of which serves to protect the delivery line 12 and is connected to it through line 180, while jet 185 serves to protect the delivery line 15 and is connected to it through the line 181.

The line 180 that is loaded by the delivery pressure of pump 3 and the line 177 carrying the control pressure assigned to pump 3 are connected here on opposite sides to pressure chambers of identical size and the line 181 loaded with the delivery pressure of pump 4 and the line 178 loaded with the control pressure assigned to pump 4 are connected to the pressure chambers of the 4/2-way valve 182 of identical size and located on opposite sides, such that the two lines 177 and 178 loaded with control pressure are connected on the side on which the pressure spring 186 is located.

The constant pump 25 draws through the line 187 from the housing 24 of the pumps 3 and 4 and delivers into a line 188, which leads to an adjustable restrictor 189, whose adjusting element 190 is in operating connection with the adjusting element of the engine 1. A relief valve jet 193 is connected in front of restrictor 189 to the line 188 through a line 191, in which a filter 192 is located; the drain of jet 193 is connected to a line 194, which is in turn connected to the line 195, which forms the continuation of line 188 beyond the restrictor 189, and which leads to additional consumers (not shown in the drawing).

A regulated relief valve jet 196 is also connected to the line 194; its control pressure is determined through line 197 by the pressure in front of the restrictor 189. The line 198 coming from the relief valve jet 196 leads to a restrictor 199 and the line 200 coming from the latter leads through a relief valve jet 201 to the tank 156. An additional relief valve jet 202 is connected parallel to the consecutively connected relief valve jet 196 and restrictor 199; it maintains the pressure in front of the relief valve jet 196 constant. The essential point is that the pressure gradient at the restrictor 189 regulates the relief valve jet 196, which in turn regulates the stream to the restrictor 199.

A maximum-pressure control line 203 branches off from the line 198 between the relief valve jet 196 and restrictor 199 and a second relief valve jet 204 branches off from line 200. The line 203 branches into two lines 205 and 206, which empty into a control pressure chamber of the servo control valve 10 and 23 respectively, i.e., on the same side on which the latter is loaded by the delivery pressure of the assigned pump 3 or 4. Two lines 207 and 208 branch off from the line 204; they lead to the other, spring-loaded side of the hydraulically controlled servo control valve 10 or 23.

The mode of operation is as follows: If the engine 1 is running and is driving the pumps 3, 4, 25, 26 and none of the control pressure pick-offs 93, 92, 91, 90, 120, 121, 122, 123, 130, and 129 are actuated, the pumps are in the zero-stroke position and do not deliver. No consumer is acted upon. Now if the control pressure pick-off 92 is actuated, the single-edge servo valve spool 31 is actuated and opens so that it effects a connection between the delivery line 12 and the line 44 to the working cylinder 48, in which case the parallel-connecting restrictor 40 opens. At the same time, the check valve 79 opens, so that the lines 80 and thus 81 are also loaded with pressure.

Because the single-edge servo valve spool 31 acts as a metering restrictor, the pressure in line 35 and thus the pressure in line 43 and thus also the pressure in lines 78, 80, and 81 are less than the pressure in the branch delivery line 28 and the delivery line 12. The pressure in the delivery line 12 acts through lines 13, 14, and 154 on one side of the servo control valve 10 and the pressure in the control pressure line 81 acts through lines 150, 151, 152 on the other side of this servo control valve, on which the spring also acts. The spring is designed here so that the servo control valve 10 responds at a quite definite pressure difference between the pressures in the lines 154 and 152 e.g., to a pressure difference of 20 bar. As a result, the adjusting element 5 of pump 3 is regulated by means of the servo control valve 10 through the pump adjusting piston 6 such that it delivers a stream that produces this predetermined pressure gradient at the single-edge servo valve spool 31 acting as a metering restrictor. That is, if the setting of the single-edge servo valve spool 31 is modified by charging the setting of the control pressure pick-off 92, the pump 3 will also be set to a different delivery stream, such that the predetermined pressure gradient again results at this single-edge servo valve spool 31 acting as a metering restrictor.

The parallel-connecting restrictors 40, 50, 96 or 97 and 116 or 117 have the following mode of operation: If two control pressure pick-offs assigned to two different consumers are simultaneously actuated, e.g., pick-offs 92 and 90, two single-edge slide valves, 31 and 86 in the present case, are simultaneously opened and thus two consumers, namely, the two working cylinders 48 and 49 on the one hand and working cylinder 86 on the other, are simultaneously connected with the same pump 3. The same pressure acts here in both working cylinders 48 and 49. However, it is unlikely that the same pressure also acts in the working cylinder 86. Rather, one of the consumers will be more highly loaded and thus require a higher pressure. Assuming that the pressure in the working cylinder 86 is higher than the pressure in the working cylinders 48 and 49, a higher pressure is present at the branching point 98 than in the line 43, with the result that the check valve 79 will be closed and the control line system 80, 83 is loaded by the pressure present at the branching point 98 through the opening of the check valve 101. Because the back sides of the slide valves 41 and 241 are also acted upon by this control line system, but different pressures prevail in the line 35 or 240 in front of this slide valve, a different throttling effect will be produced at the restrictors 40 and 96, i.e., such a large pressure gradient will be produced by this parallel-connecting restrictor 40 in the consumer 48, 49, which produces the smaller pressure, that such a high pressure, as required in the consumer 86, will be produced in front of this parallel-connecting restrictor 40 in line 35 and thus in line 28 and thus in line 12 and thus in line 82, in which case a correspondingly smaller throttling effect will be produced at the parallel-connecting restrictor 96 as a result of the pressure in line 240 under the action of the control pressure in line 83, because with this pressure the consumer pressure that acts on the slide valve 241 is sufficiently large to open the parallel-connecting restrictor 96 completely so that no pressure gradient develops at it.

This arrangement of the parallel-connecting restrictors, which are acted upon in common on the back side by the same control pressure, has the significant advantage that if two consumers together were able to absorb a greater stream than pump 3 delivers, the stream delivered by pump 3 to the two consumers, 48, 49 on the one hand and 86 on the other in the present case, is distributed proportionally to the opening width of the throttle gaps.

The check valves 58 and 68 act to protect against pipe rupture. This means that if a leak develops in line 12 or line 28 or line 82 or in another line connected with them and the pressure escapes, the consumer, which is connected by actuation of the assigned control pressure pick-off and thus opening of the assigned single-edge slide valve, cannot fall back under load. If for example it is raised under load and the working cylinders 48 and 49 are thus under pressure and then line 12 ruptures, the check valve 58 closes. The fluid present in the working cylinders 48 and 49 is thus enclosed and fixed so that no undesired movement can occur, since, the relief valve jets 60 and 70 are also closed because there is no pressure in lines 53 and 43 and thus the relief valve jets 60 and 70 are not regulated.

However, if the single-edge servo valve spool 31 is opened through actuation of the control pressure pick-off 92, pressure is present in line 43, such that pressure medium flows into the working cylinders 48 and 49 through the lines 43 and 44. The pressure present in line 43 is also present through line 73 in the control pressure chamber of the relief valve jet 60, so that it is opened. This means that the stream of pressure medium flowing from the pressure chambers 56 and 57 of the working cylinders 48 and 49 can flow off unhindered through line 54 into line 59, the relief valve jet 60, lines 61 and 62, and into the component return line 39 and thus into the return line 102. The speed of movement of the piston in the working cylinders 48 and 49 will be determined here by the degree to which the single-edge slide valve 31 is opened. If the pistons in the working cylinders 48 and 49 attempt to speed up with regard to this stream as a result of external forces, they draw more fluid, with the result that the pressure in line 44 and thus in line 43 drops. The pressure in the control pressure chamber of the relief valve jet 60 will thus also be reduced through line 73 so that the latter closes to the extent by which the pressure is reduced, i.e., a throttling effect is produced in the relief valve jet 60 that throttles the stream flowing from the pressure chambers 56 and 57, such that the speed of movement of the pistons in the working cylinders 48 and 49 is braked by this throttling effect. However, the relief valve jets 60 and 70 are also regulated by the pressure in lines 59 and thus 54 or 69 and thus 44. The relief valve jets 60 and 70 thus also act as a protection against inadmissibly high pressure in the working cylinders 48 and 49. This means that if an excessive pressure develops as a result of overloading or jerky loading, either jet 60 or jet 70 opens as a result of the excessive pressure, depending on the direction of loading; therefore, these relief valve jets 60 and 70 also act as overloading-protection excess-pressure valves even if neither of the control pressure pick-offs 92 and 93 is actuated.

Especially in such a case of pressure medium flowing off through one of the relief valve jets 60 and 70, but also in any other case of resuction into one of the pressure chambers 46, 47, or 56, 57, the assigned resuction check valve 64 or 66 opens so that the line 102 can be recharged from the tank 103 through the opened resuction check valve 64 or 66 and the line 62 and the component return line 39.

If the control pressure pick-off 92 has been actuated and thus the single-edge slide valve 31 has been opened and thus line 43 has been placed under pressure through the delivery line 12 and lines 28, 29, 35, and subsequently actuation of the control pressure pick-off 92 is ended and thus single-edge slide valve 31 is brought into the relief position, the parallel-connecting restrictor 40 closes completely. This would have the result that the last-active pressure persists in line 43 and thus maintains the relief valve jet 60 in the open position through line 73. However, if the two control pressure pick-offs 92 and 93 are closed, the two relief valve jets 60 and 70 would also be closed. Therefore, a check valve 94 opening toward the pump 3 is provided in the slide valve 41; in the said operating state this has the result that the line 43 is relieved through check valve 94 when the parallel-connecting restrictor 40 is closed.

The valves on the other side of the control unit 74 or the corresponding valves in the control unit 85 or 100 or 111 function in an analogous manner.

If a pressure is produced by action on the control pressure pick-off 92 in the pressure pick-off control pressure line 33 such that the single-edge servo valve spool 31 is opened quite far, such a strong stream is thus required in lines 29, 35 and thus also 28 and the delivery line 12 that the pump 3 alone can no longer deliver it. In this situation the coupling unit 179 begins to act. As already stated, if the spring acting on servo control valve 10 for regulating the pump 3 through the latter valve 10 is designed such that a definite pressure gradient develops at the single-edge servo valve spool 31 acting as a metering restrictor, e.g., 20 bar. The spring 186 at the 4-connection/2-position valve 182 is designed so that this valve responds at a lower pressure gradient, ca. 15 bar, between the delivery line 12 and the control pressure line 81. The 4-connection/2-position valve 182 is designed here so that when the slide valve begins to move, the control lines 177 and 178 are first connected together, with the result that pump 4 is swung out so far that the same pressure is present in the delivery line 15 as in delivery line 12, in which case this pressure is produced in front of the restrictor 176 if no consumer is connected to pump 4. With further movement of the slide valve in the 4-connection/2-position valve 182, the lines 180 and 181 are then also connected by the valve 182 so that the delivery stream of pump 4 is additionally delivered into the delivery line 12 of pump 3 through the 4-connection/2-position valve 182, in which case the pump 4 is now swung out so far that it produces precisely the delivery stream required in order to produce, together with the delivery stream of pump 3, the pressure gradient required, 15 bar in the present case, at the single-edge servo valve spool 31 acting as a metering restrictor.

Although the consumers are protected directly by the relief valve jets 60, 70, and the corresponding relief valve jets at the other consumers, it is necessary to provide additional protection for pump 3 and the entire installation through a relief valve jet that prevents a component of the installation from being damaged by inadmissibly high pressure. For practical reasons, this relief valve jet is incorporated into the coupling unit 179 i.e., relief valve jet 184 is connected through line 180 to the delivery line 12 and in a corresponding manner the relief valve jet 185 is connected to the delivery line 15 of pump 4 through line 181 in order to protect pump 4. The opening of one of these relief valve jets has the disadvantage that pressure medium is released through it as the maximum possible pressure; that is, a great deal of energy is wasted in this relief valve jet. This is unavoidable in handling brief pressure surges, but it is advantageous if the prolonged opening of this relief valve jet can be avoided. The relief valve jet 157 is assigned to pump 3 for this purpose; it is set at such a low pressure that it opens if a pressure prevails in the control line 81 that, as a function of the prescribed pressure gradient at the metering restrictor formed by the single-edge slide valves 31 or 32 or 86 or 87, is below the response pressure of relief valve jet 184, such that relief valve jet 157 opens before relief valve jet 184 opens and thus limits the maximum possible pressure in line 152, with the result that with a slight increase in the pressure in line 154 the servo control valve 10 increases the pressure in pressure chamber 8 of the pump adjusting cylinder 7 and thus adjusts the pump 3 to a smaller stroke and thus a smaller delivery stream, in which case it can be expected that after the completion of this regulation process which is induced by increasing the control pressure, the pressure in the delivery line 12 is reduced as a result of the diminished delivery stream and thus the response of the relief valve jet 184 can be avoided.

A corresponding relief valve jet 172 is assigned to pump 4 in an analogous manner; it responds to the pressure in the control pressure line 166 and opens before the relief valve jet 185 opens.

In any case, only a protection against pressure peaks during the regulation process of the pump is achieved with this relief valve jet. There is no protection against overloading of the engine 1. This is achieved with the maximum-load control mechanism 230. The constant pump 25 delivers through the line 188 to the adjustable restrictor 189, whose adjusting element 190 is in operating connection with the adjusting element of the engine 1. The line 195 beyond the restrictor leads to the control pressure pick-offs 90, 91, 92, 93, 120, 121, 122, 123, 129, and 130. The externally regulated relief valve jet 196 is connected to this line 195 and it is influenced through line 197 by the pressure in line 188 in front of the restrictor 189. The relief valve jet 196 is set to the pressure gradient that is to prevail at the restrictor at the prescribed operating r.p.m. If this pressure gradient is present, the relief valve jet 196 is closed. If the pressure gradient is smaller than prescribed, the relief valve jet 196 opens and delivers a stream to the subsequent restrictor 199, at which a pressure gradient now also develops and this pressure gradient is switched through the lines 203 and 204 as a pressure difference to the two sides of both servo control valves 10 and 13. It is thus achieved that if both pumps 3 and 4 deliver to at least one consumer and the maximum-load control mechanism 230 engages, both pumps 3 and 4 are proportionally, i.e., percentually to the same degree, retracted so that the direction of movement resulting from the movement overlapping is not modified in the case of the overlapped movement of two driven working cylinders. The speeds of movement of two switched-in consumers are in the same ratio to each other as the openings of the single-edge servo valve spools that act as metering restrictors. Now if the engine r.p.m. drops as a result of overloading of the engine 1, the pressure gradient at the restrictor 189 will decrease and thus open the relief valve jet 196; thus, a pressure gradient will develop at the restrictor 199 that acts on both servo control valves 10 and 23 identically. The setting of both pumps 3 and 4 is thus shifted toward a smaller stroke volume per revolution, but only far enough that the pressure gradient at the restrictor 199 and the pressure drop at the single-edge slide valve acting as a metering throttle of the consumer switched in maintain an equilibrium. If there is a tendency at one of pumps 3 or 4 to speed up, it immediately receives a countersignal that again equalizes the two pressure gradients. In this manner, the pressure gradients at the single-edge servo valve spools of both consumers, which act as metering throttles, are maintained identical, with the result that the absolute quantities, and not the ratio of the quantities to each other and thus the ratio of the speeds of movement to each other vary at these single-edge servo valve spools acting as metering throttles.

The relief valve jet 202 serves to protect the constant pump 25. The by-pass relief valve jet 193 also protects the constant pump 25 when the restrictor 189 is closed too much or completely. In this case the oil flows through line 188, line 191, and the relief valve jet 193 into line 194.

The pump 26, which delivers to the steering mechanism (not shown in the drawing) of the dredger, is used to charge the pressure reservoir 103. The return from the steering mechanism still has enough pressure to charge the reservoir 103. The line 239 coming from the steering mechanism is connected to line 102 for this purpose.

The pump 25 draws from the housing 24, in which the two pumps 3 and 4 are located, in order to effect an exchange of pressure medium in the housing 24. The pressure medium flowing back from the steering mechanism through line 239, provided it is excessive, flows through the relief valve jet 201 into the pressureless tank 156.

The volume of the reservoir 103 is dimensioned so that leakage losses and volume differences on the two sides of the piston can be compensated even with the actuation of several consumers in the same direction.

Figure 11:
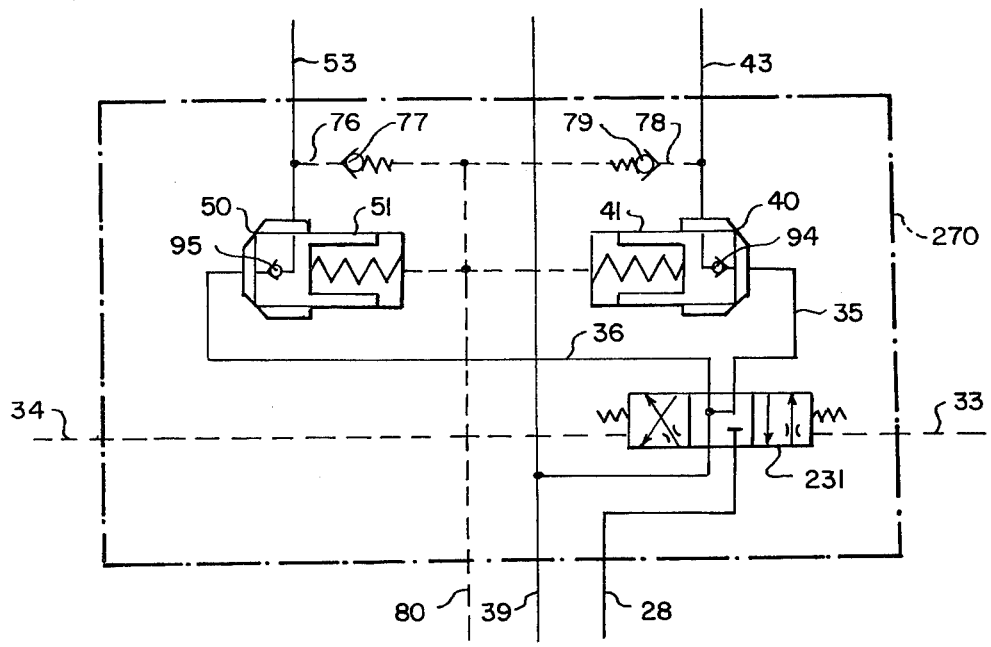
FIG. 11 shows another embodiment for a partial control unit.

A modified construction of a component control unit is shown in FIG. 11. The component control unit 270 corresponds to the component control unit 27, the only difference being that, instead of the two single-edge servo valve spools 31 and 32, which form the two metering restrictors in the component control unit 27, a single 4-connection/3-position valve 231 is provided; it can be set by means of the two control pressure pick-offs 92 and 93 through the control pressure lines 33 or 34 and, in the neutral position shown in the drawing, shuts off the branch delivery line 28 and connects the lines 35 and 36 together and, in a controlled position, connects the branch delivery line 28 with the line 35 and at the same time connects the line 36 with the return line 39, and, in the other controlled position, connects the branch delivery line 28 with the line 36 and at the same time connects the line 35 with the return line 39.

The supplementary control unit 133 has a somewhat different construction and a different mode of operation than the control units 85 or 110 or 111. The 4-connection/3-position valve 128 is regulated not only by the two control pressure pick-offs 129 and 130, but it is also acted upon on the side opposite the regulated side by the delivery pressure in the line 131 or 132 leading to the consumer, so that when the valve 128 is regulated through one of the control pressure pick-offs 129 or 130, an equilibrium state sets in at the slide of valve 128. If the pressure drops at the consumer, the valve is opened wider, so that a larger stream flows to the consumer and thus the pressure is increased at the consumer as a function of the characteristics of the letter.

Figure 12:
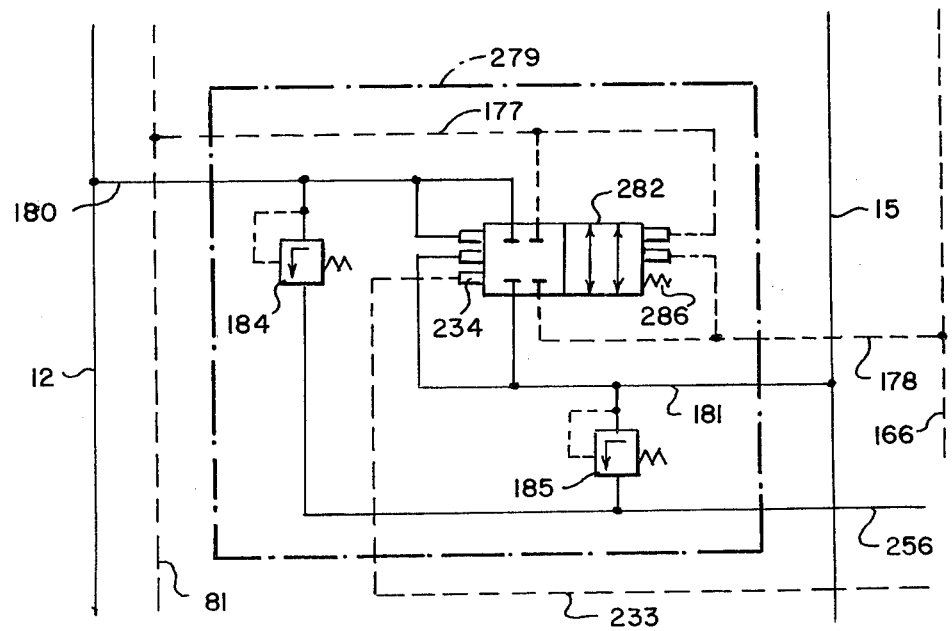
FIG. 12 shows an improved construction for a coupling unit.

A modified construction of a coupling unit is shown in FIG. 12. The coupling unit 279 corresponds essentially to coupling unit 179, in which case the 4-connection/2-position valve 282 corresponds essentially to valve 182. A branch line 180 coming from the delivery line 12 and, opposite this, a coupling control line 177 coming from the control line 81 are connected to valve 282, also in the same manner as to the valve 182, and a branch line 181 coming from the delivery line 15 is also connected and a coupling control line 178 coming from the control pressure line 166 is connected to the opposite control pressure chamber.

Figure 4:
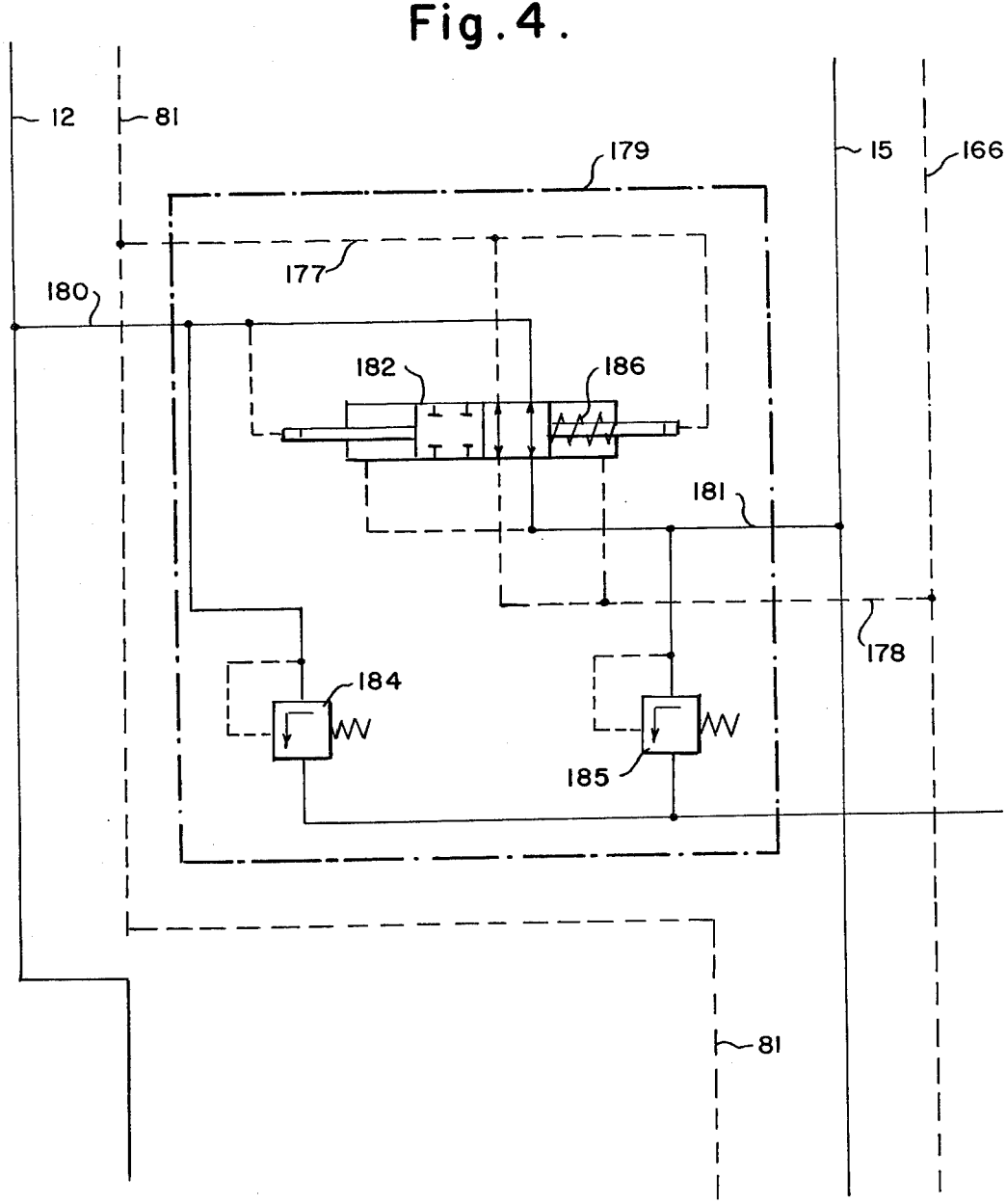
FIG. 4 shows the circuit diagram for the coupling unit used in FIG. 1.
Figure 5:
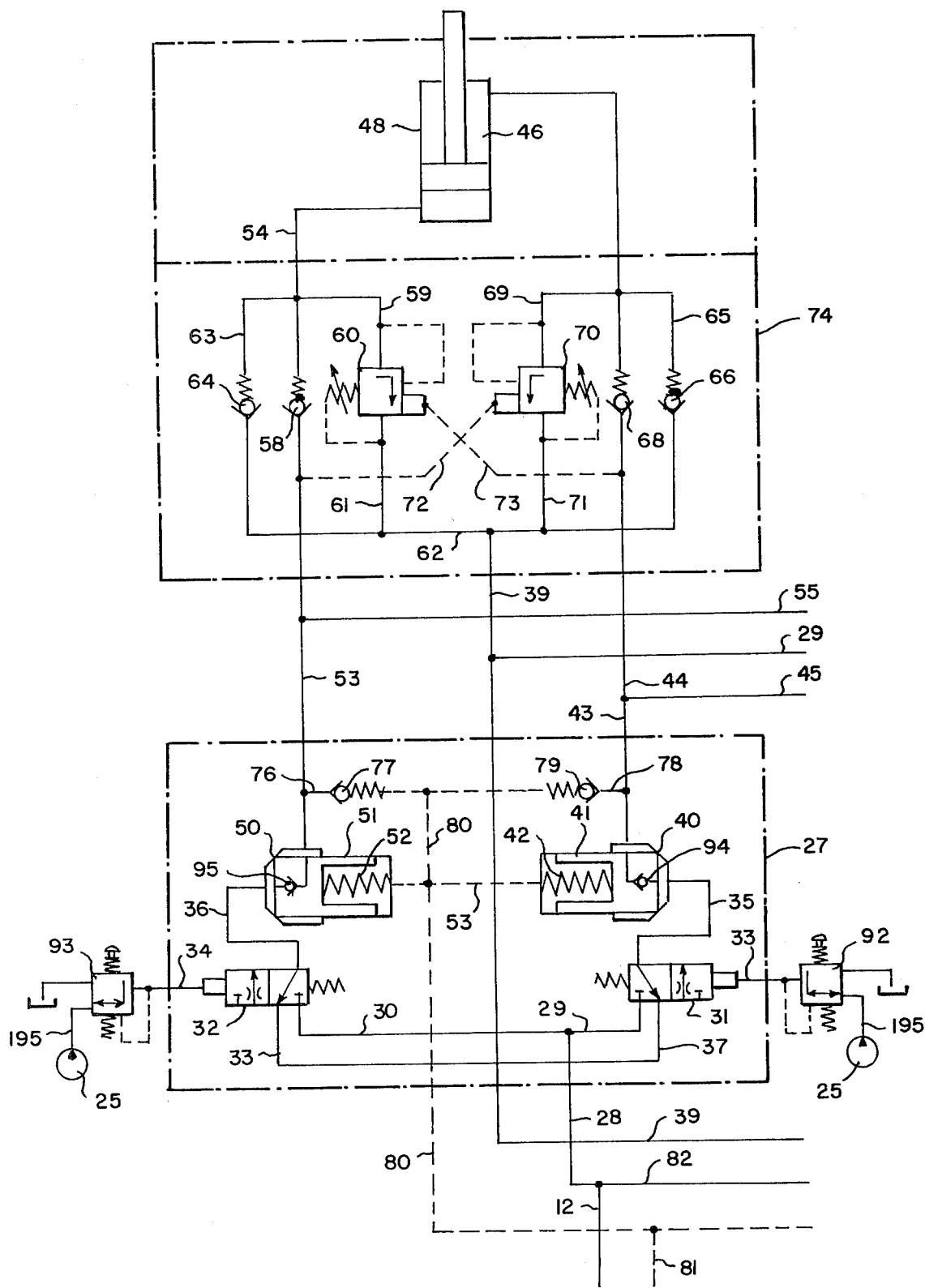
FIG. 5 shows the circuit diagram for the partial control unit used for the control unit of FIG. 1.
Figure 6:
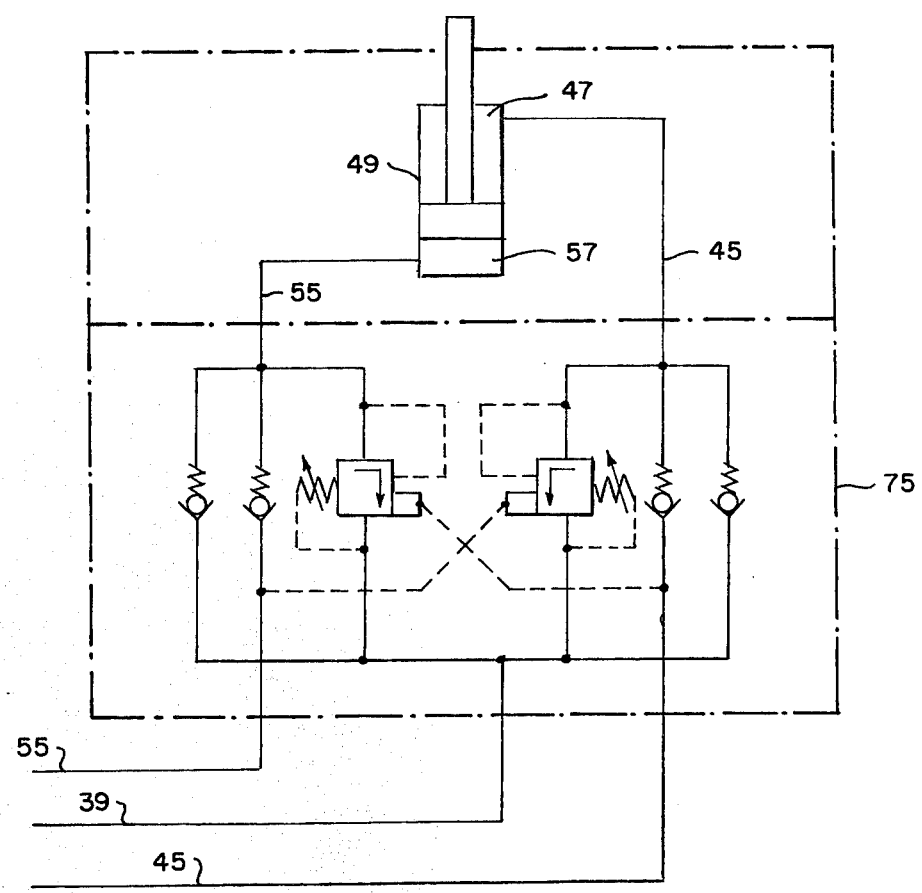
FIG. 6 shows the circuit diagram for the control unit with assigned consumer of FIG. 1.
Figure 7:
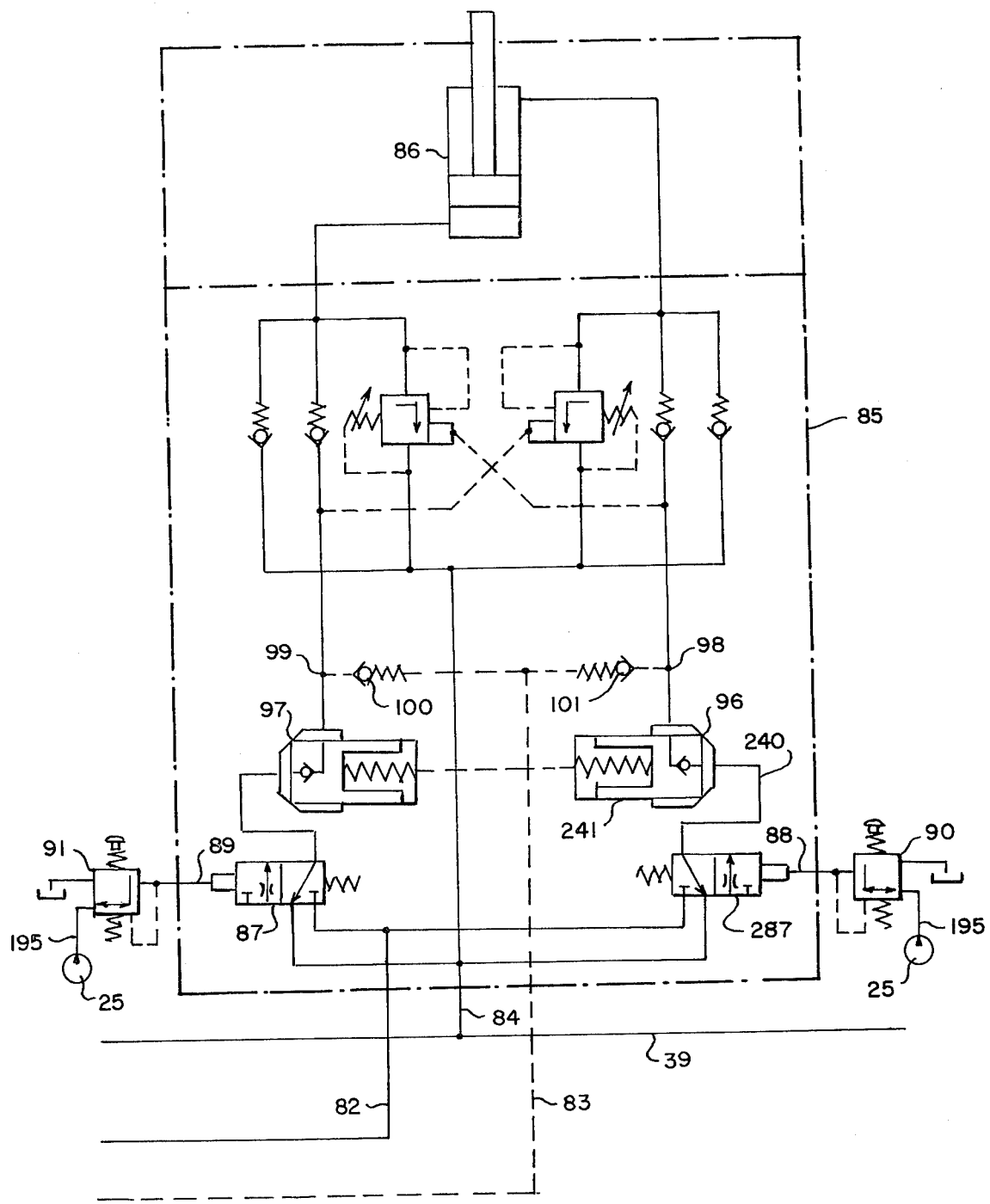
FIGS. 7, 8 and 9 show an overall control unit with assigned consumers.
Figure 8:
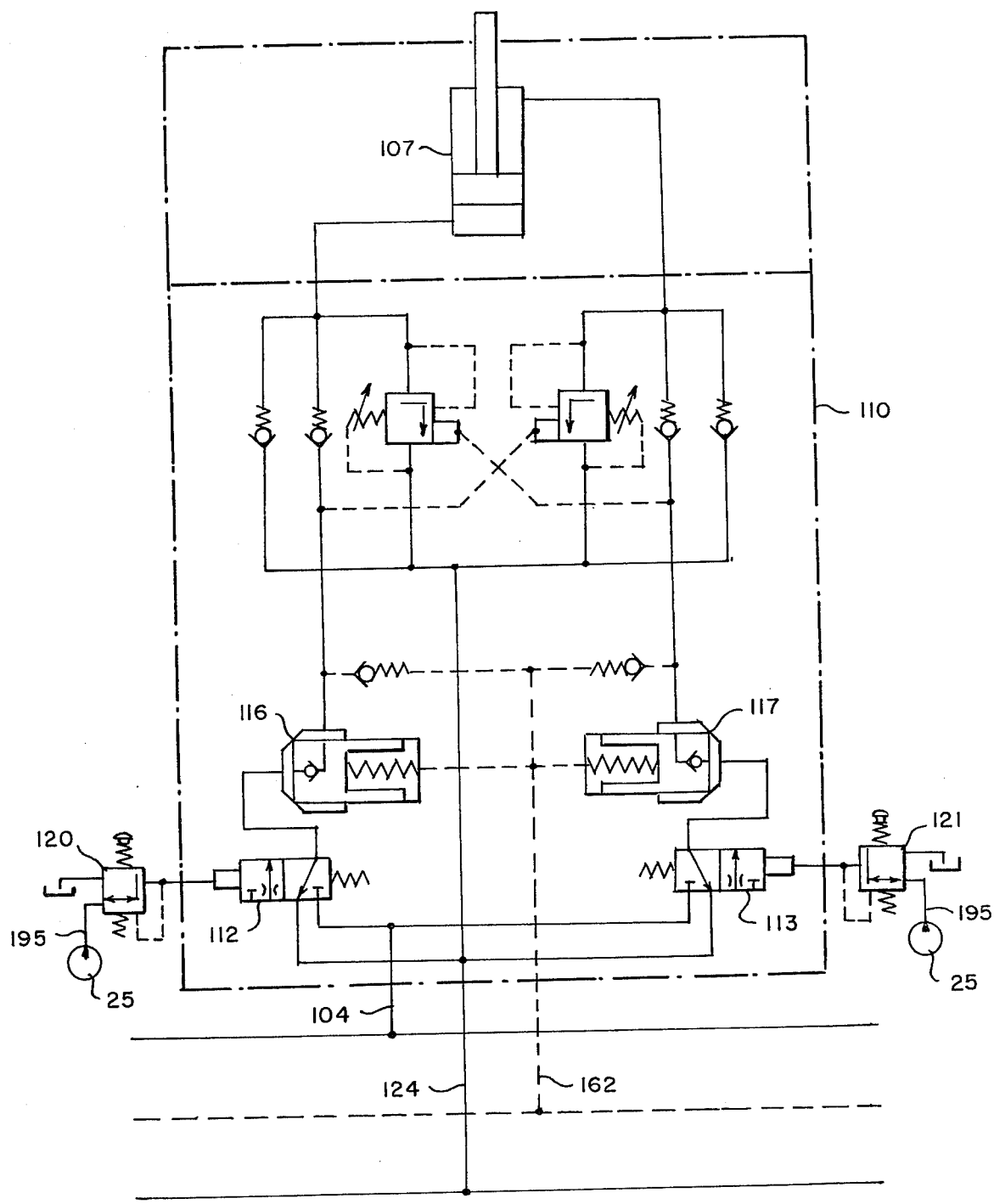
Figure 9:
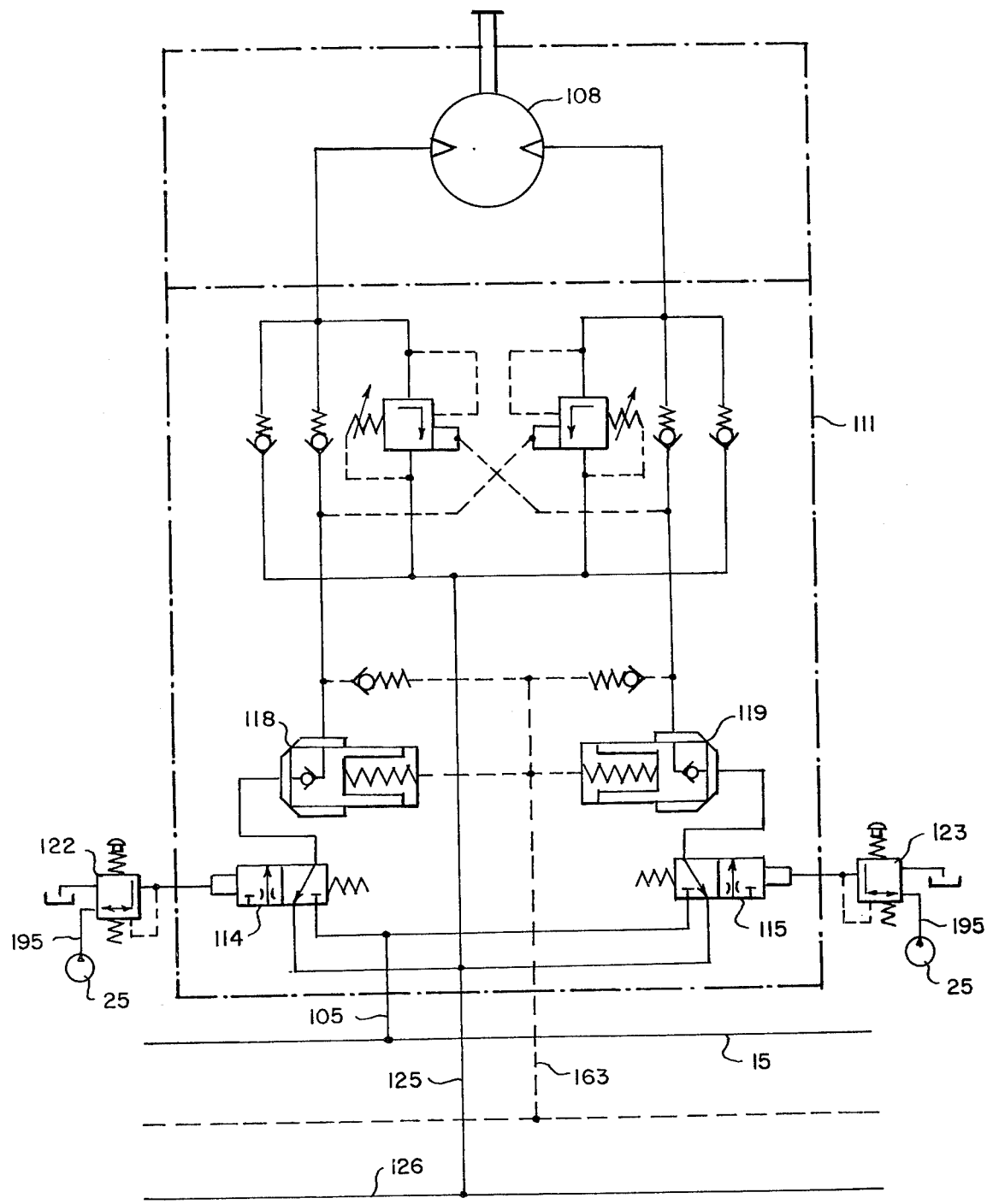
Figure 10:
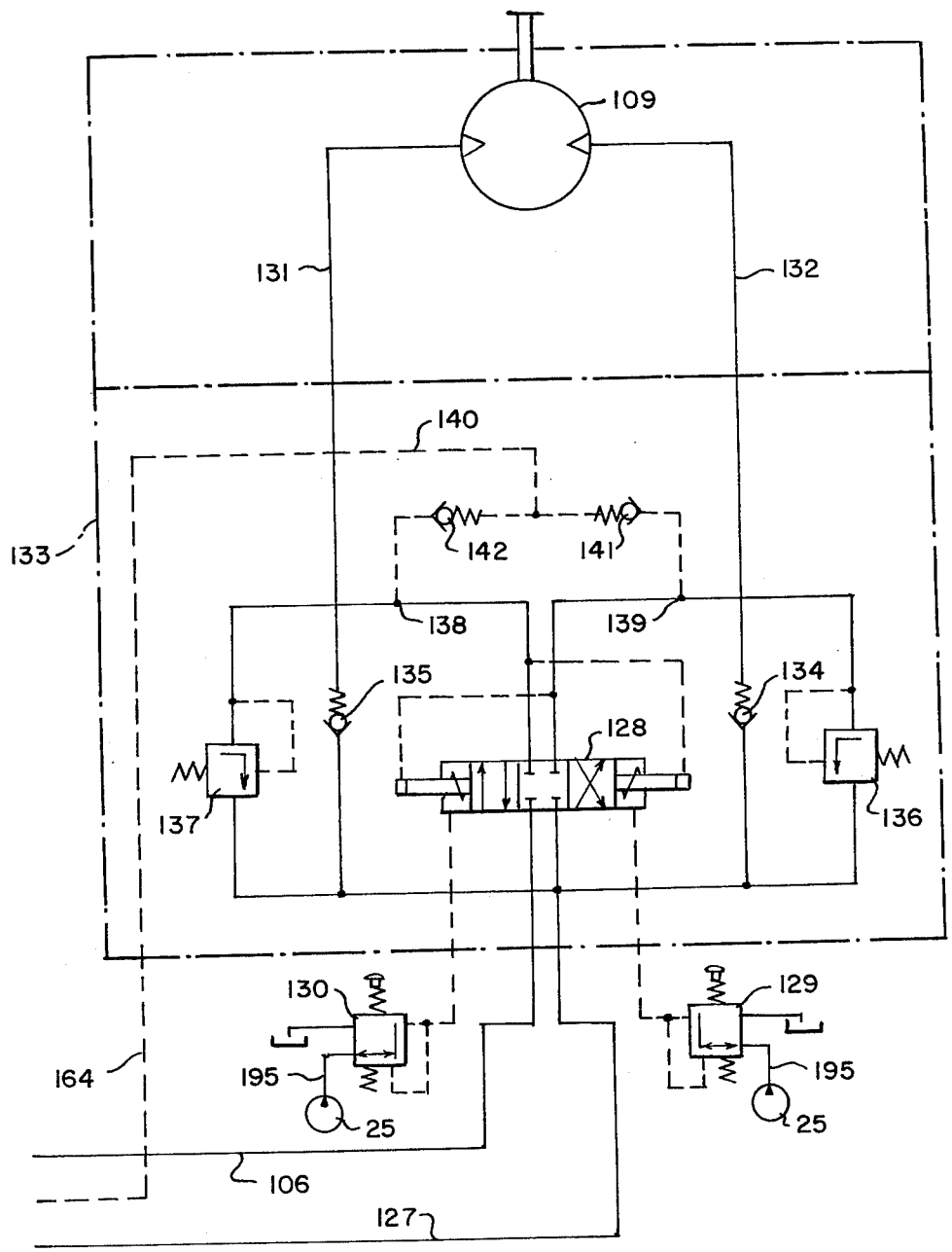
FIG. 10 shows the circuit diagram for a constant pressure regulation.

In contrast to valve 182, valve 282 has a third control pressure chamber 234 on the side opposite the pressure spring 286; it is connected through a line 233 to the maximum-load control element 230 such that if the latter sends a signal to the servo control valves 10 and 23, by which the final control element 5 of pump 3 and the final control element 16 of pump 4 are displaced toward a smaller stroke volume, the coupling valve 282 is prevented from opening. A pressure is thus exerted by the maximum-load control element 230 through the control line 233 on the additional pressure chamber 234 that loads the element of the coupling valve 282 toward the closed position. The coupling unit 279 is to connect the two delivery lines 12 and 15 of the two pumps 5 and 4 together only if one of the two pumps is set at the highest possible delivery stream and the pressure gradient at the single-edge servo valve spool 32 acting as a metering restrictor still drops below the prescribed value. This pressure gradient at the single-edge servo valve spool 31 acting as a metering restrictor also decreases however if the maximum-load regulator 230 engages, with the result that the stroke volume of pump 4 or 5 is set to a smaller value than would correspond to the pressure gradient at the metering restrictor. A coupling unit of the type shown in FIG. 4 responds however to any drop in the pressure gradient at the single-edge servo valve spool 31 acting as a metering restrictor, with the result that the delivery lines 12 and 15 are also connected together if the drop is caused only by the engagement of the maximum-load regulator 230. In order to eliminate this shortcoming, the switching pressure difference at which the coupling unit 279 exerts the coupling function is reduced by loading the third pressure chamber 234 to the same extent as the pressure gradient at the single-edge servo valve spool 31 acting as a metering restrictor is reduced by the signal of the maximum-load control device 230.

The system according to the invention effects an automatic coupling of two delivery lines assigned to one pump as soon as the maximum possible delivery stream of one pump is not sufficient to cover the stream required. The difference between the stream required and the maximum possible stream for one pump is then delivered by the second pump, which is automatically adjusted accordingly.

In the foregoing specification I have set out certain preferred practices and embodiments of my invention, however, it will be understood that this invention may be otherwise embodied within the scope of the following claims.

I claim:

1. In a hydrostatic drive system consisting of at least two component systems, each of which has an adjustable pump, a delivery line coming from each pump and leading to at least one consumer, in the line which an arbitrarily adjustable metering restrictor is installed, and a pump adjusting cylinder with a pump adjusting piston connected with the adjusting element of the associated pump, where the loading of the pump adjusting cylinder is regulated by a hydraulically controlled servo control valve, one side of which is acted upon by the delivery pressure of the associated pump and the other side is acted upon through a control pressure line by pressure beyond the metering restrictor, the improvement comprising a coupling valve to which all delivery lines and all the control pressure lines are connected, each through a branch connection line wherein the said valve in the closed position shuts off all the branch connection lines and in the open position connects all the delivery lines together and all the control pressure lines together and is hydraulically controlled, a first pressure chamber on one side of said valve to which each delivery line is connected, a valve element in said pressure chamber being loaded with a pretensioned spring on said first chamber, and a second pressure chamber on the other side of said valve element to which each control line is connected, the said two pressure chambers assigned to one component system being of the same size on both sides of the valve element and the open position of the valve element being set when a pressure gradient prescribed by the pretensioning between the delivery line and the control pressure line is no longer reached.

2. A drive system according to claim 1, characterized in that all the delivery lines are connected on one side of the valve element and all the control pressure lines are connected on the other side.

3. A drive system according to claim 1, characterized in that the control edges in the valve element are situated so that when the valve element is displaced toward the open position, the control lines are first connected together, and then the delivery lines are connected together.

4. A drive system according to claim 1 or 2 or 3 with a maximum-load regulating element, which sends a signal to the servo control valve to set the pump to a smaller stroke volume per revolution when the r.p.m. of the pump drive shaft drops below a prescribed value, characterized in that the signal of the maximum-load regulating element also has an inhibitory effect on the opening of the coupling valve.

* * * * *